United States Patent
Exner et al.

(10) Patent No.: US 11,202,176 B2
(45) Date of Patent: Dec. 14, 2021

(54) POWER SAVING FOR DEVICE TRACKING

(71) Applicant: SONY NETWORK COMMUNICATIONS EUROPE B.V, Hoofddorp (NL)

(72) Inventors: Peter Exner, Malmö (SE); Andrej Petef, Lund (SE); Henrik Sundström, Södra Sandby (SE); Magnus Tillgren, Malmö (SE); Magnus Johansson, Lund (SE)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 17/059,055

(22) PCT Filed: Apr. 25, 2019

(86) PCT No.: PCT/SE2019/050373
§ 371 (c)(1),
(2) Date: Nov. 25, 2020

(87) PCT Pub. No.: WO2019/245420
PCT Pub. Date: Dec. 26, 2019

(65) Prior Publication Data
US 2021/0211838 A1 Jul. 8, 2021

(30) Foreign Application Priority Data
Jun. 18, 2018 (SE) .................... 1850740-0

(51) Int. Cl.
*H04W 52/02* (2009.01)
*H04W 4/029* (2018.01)
*H04W 72/12* (2009.01)

(52) U.S. Cl.
CPC ....... *H04W 4/029* (2018.02); *H04W 52/0216* (2013.01); *H04W 52/0254* (2013.01); *H04W 72/1268* (2013.01)

(58) Field of Classification Search
CPC .. H04W 16/14; H04W 4/029; H04W 52/0216
See application file for complete search history.

(56) References Cited

U.S. PATENT DOCUMENTS 8,655,378 B1 2/2014 Crossno
2002/0094815 A1 7/2002 Kanerva
(Continued)

FOREIGN PATENT DOCUMENTS

WO 2017023860 A1 2/2017

OTHER PUBLICATIONS

International Search Report and Written Opinion from corresponding International Application No. PCT/SE2019/050373, dated Jul. 18, 2019, 11 pages.
(Continued)

Primary Examiner — Michael T Vu
(74) Attorney, Agent, or Firm — Tucker Ellis LLP (57) ABSTRACT

A method for controlling upload of data, performed in an electronic device (100), wherein said electronic device is configured to intermittently upload data (520) to a wireless network to operate as a tracker, said method comprising: obtaining (500) a current position of the electronic device, determining, dependent on network coverage associated with said position, to either upload data (530) to the network or postpone (430) upload of data.

12 Claims, 4 Drawing Sheets

(56) References Cited

U.S. PATENT DOCUMENTS

| | | |
|---|---|---|
| 2004/0017310 A1 | 1/2004 | Vargas-Hurlston |
| 2010/0100876 A1 | 4/2010 | Glover |
| 2013/0072223 A1* | 3/2013 | Berenberg .......... G06F 16/9537 |
| | | 455/456.1 |
| 2014/0213307 A1 | 7/2014 | Minor |
| 2015/0119094 A1 | 4/2015 | Bartels |
| 2016/0248704 A1 | 8/2016 | Soelberg |
| 2017/0006431 A1 | 1/2017 | Donovan |
| 2017/0111942 A1* | 4/2017 | Chang .................... H04W 4/70 |
| 2017/0332392 A1 | 11/2017 | Miao |
| 2018/0041982 A1 | 2/2018 | Mulaosmanovic |
| 2019/0191446 A1* | 6/2019 | Liu .......................... H04L 5/00 |

OTHER PUBLICATIONS

Swedish Search Report from corresponding Swedish Application No. 1850740-0, dated Feb. 20, 2019, 4 pages.

* cited by examiner

POWER SAVING FOR DEVICE TRACKING

TECHNICAL FIELD

The present invention generally relates to electronic devices and, more particularly, to methods for tracking using such an electronic device. Various embodiments specifically relate to methods for tracking goods during transport along a route, performed in an electronic device accompanying said goods.

BACKGROUND

Wireless network service providers, also referred to as mobile network operators, have been enjoying extensive growth in network user population and subscriptions. The majority of electronic device operating on mobile networks operating on mobile networks are mobile devices such as mobile phones, tablets, portable computers and the like, and are commonly referred to as user equipment ("UE"). Mobile network operators manage cellular networks for providing communication coverage to their subscribers or customers, such as under the Third Generation Partnership Project ("3GPP") networks commonly referred to as e.g. 3G (such as UMTS) or 4G (such as LTE). In addition to cellular networks, also non-cellular local area networks are frequently operated, such as under the Wireless LAN standard IEEE 802.11 commonly referred to as wifi.

One area of implementation of radio communication relates to machine-to-machine communication (M2M), which typically differs from customary use of radio communication in that no user need to be in active control for setting up or carrying out the communication. A device strictly configured for M2M need as such not even incorporate a user interface, such as a display, keypad, microphone or speaker. M2M communication has, as such, been used extensively already since the introduction of GSM. Various players on the market have also implemented different proprietary systems with Low-Power Wide-Area Networks such as LoRa®, RPMA, and SIGFOX. Recently, however, dedicated technical standards have been developed which are suitable for the purpose of M2M communication. This includes e.g. MTC (Machine Type Communication), for which service requirements have been outlined in 3GPP technical specification 22.368 and is further described in various associated specifications. MTC provides e.g. extended Discontinuous Reception (DRX), with longer sleep cycles optimized for delay-tolerant, device-terminated applications. Another commitment within 3GPP relates to Narrow-band Internet of Things (NB-IOT). In 2016 3GPP completed the standardization of NB-IoT, the new narrow-band radio technology developed for the Internet-of-Things, by accepting a wide number of specification changes implementing the feature of NB-IoT Release 13 (LTE Advanced Pro). The types of communication systems referred to above are different examples of M2M network solutions, which may be implemented for communication with wireless radio devices. It is believed that the number of wireless devices operating various forms of IoT communication in general, and NB-IoT in particular, will increase rapidly in the near future.

One field of use for IoT electronic devices is tracking or monitoring of position or movement. An example of such a solution is disclosed in US2010/0100876. Electronic devices configured for monitoring or tracking position may be configured to store such data, which may subsequently be read from memory in the electronic device.

One way of conveying obtained data from an electronic device is to intermittently upload data to a data collecting entity, such as a server or computer system, through a communication network. Data upload may happen at various frequencies based on many factors. One example could be to upload data at a fixed pre-set schedule, like once an hour or once a day. At this point the electronic device would upload the buffered data, such as position data and other obtained sensor data collected since the last upload. However, using a fixed schedule is far from optimal since the device is mobile and it may be in situation where the connectivity is sparse or non-existent. A consequence of this would be that the electronic device may need to put maximum output power on a modem, or it would get no connection at all—and may still not despite trying. For various types of IoT electronic devices, this operation is one of the most significant power consumers and thus an area that is highly relevant to optimize. Electronic devices used for tracking or monitoring position are often battery powered and face problems with regard to power consumption. This is particularly prominent for electronic devices that are mobile and use energy-expensive features such as cellular connectivity and GNSS based positioning. An optimized energy efficiency is thus extremely important for such IoT electronic devices and systems.

SUMMARY

On a general level, a solution is proposed herein wherein upload of data is controlled to take place at variable frequency based on e.g. position, intended route and connectivity coverage. In various aspects, this solution may be implemented in an electronic device, in a network entity for controlling an electronic device, or in methods performed by the electronic device or by the network entity. An objective of these solutions is to at least partly overcome one or more limitations of the prior art as noted in the background section or in the description below. Still other objectives, as well as features, aspects and advantages of the present invention will appear from the following detailed description, from the attached claims as well as from the drawings.

In accordance with a first aspect, a method is provided for controlling upload of data, performed in an electronic device, wherein said electronic device is configured to operate as a tracker by intermittently uploading data to a wireless network while moving along a route, said method comprising, at a scheduled occasion for data upload:
  obtaining a current position of the electronic device;
  determining coverage data associated with said current position based on a stored network coverage map;
  determining, dependent on the coverage data of the network coverage map, to postpone upload of data to a later instance, based on
    the stored coverage data associated with said position not exceeding a first coverage level threshold, and
    a time limit between data uploads not being exceeded at said later instance;
  or otherwise attempt to upload data.

In one embodiment, the method comprises determining to postpone upload of data based on
  the stored coverage data associated with said position not exceeding a second coverage level threshold, representing a lower coverage level than the first threshold. In one embodiment, said later instance is determined as an expected time of arrival in a subsequent location area.

In one embodiment, the subsequent location area is a next location area along said route having an associated network coverage exceeding the first coverage level threshold.

In one embodiment, said later instance is a next scheduled instance of positioning.

In one embodiment, obtaining a current position is carried out based on predetermined positioning interval data.

In one embodiment, uploading of data, including position data, is carried out based on predetermined upload interval data.

In one embodiment, the method includes turning off a radio unit in the electronic device between scheduled occasions for data upload.

In one embodiment, the method comprises downloading, via said network, a network coverage map including location area data for a subsequent location area having an associated network coverage exceeding the first coverage level threshold.

In one embodiment, the method comprises determining parameter data associated with estimated temperature;

wherein determining to postpone upload of data is carried out based on said parameter data indicating a battery voltage drop in the electronic device exceeding a threshold.

In one embodiment, wherein said route includes a number of route positions, the method comprises obtaining sensor data related to movement of the electronic device;

wherein obtaining a current position includes determining a preceding obtained position;

calculating a position based on said sensor data, subsequent route positions, and a real-time clock;

determining to obtain a current position when the calculated position matches a subsequent route position.

In one embodiment, the electronic device is connected to accompany goods during transport along a route.

According to a second aspect, a method is provided for tracking an electronic device, performed in a network entity, connectable through a wireless network to the electronic device accompanying said goods, said method comprising:

determining a route for said electronic device;

transmitting, to the electronic device, location area data associated with at least one location area of said route, wherein the location area has associated coverage data exceeding a first coverage level threshold;

receiving a data upload from said electronic device, including current position data for the electronic device;

transmitting, to the electronic device, information associated with a subsequent scheduled occasion for data upload, determined based on the received current position data and on network coverage at said subsequent scheduled occasion along said route.

In one embodiment, said information includes location area data associated with a subsequent location area for data upload by the electronic device.

In one embodiment, said information identifies an estimated time of arrival of the electronic device in said subsequent location area.

In one embodiment, said information identifies a point in time for said subsequent scheduled occasion.

In accordance with a third aspect, a method is provided for tracking goods during transport along a route, performed in an electronic device accompanying said goods, wherein said electronic device is configured to intermittently upload data to a wireless network, said method comprising:

obtaining a current position of the electronic device, determining, dependent on network coverage associated with said position, to either upload data to the network, or postpone upload of data.

According to a fourth aspect, a method is provided for tracking goods during transport, performed in a network entity, connectable through a wireless network to an electronic device accompanying said goods, said method comprising:

determining a route for said transport;

downloading location area data associated with at least one location area of said route to the electronic device;

receiving a data upload from said electronic device, including current position data for the electronic device;

downloading information of a subsequent location area for data upload, determined based on network coverage at said subsequent location area, to the electronic device.

In one embodiment, the method comprises determining time data associated with an estimated time of arrival to said subsequent location area;

downloading said time data to the electronic device.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention. As used herein, a "set" of items is intended to imply a provision of one or more items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present invention. As used herein, the term "and/or" includes any and all combinations of one or more of the associated listed items.

Figure 1:
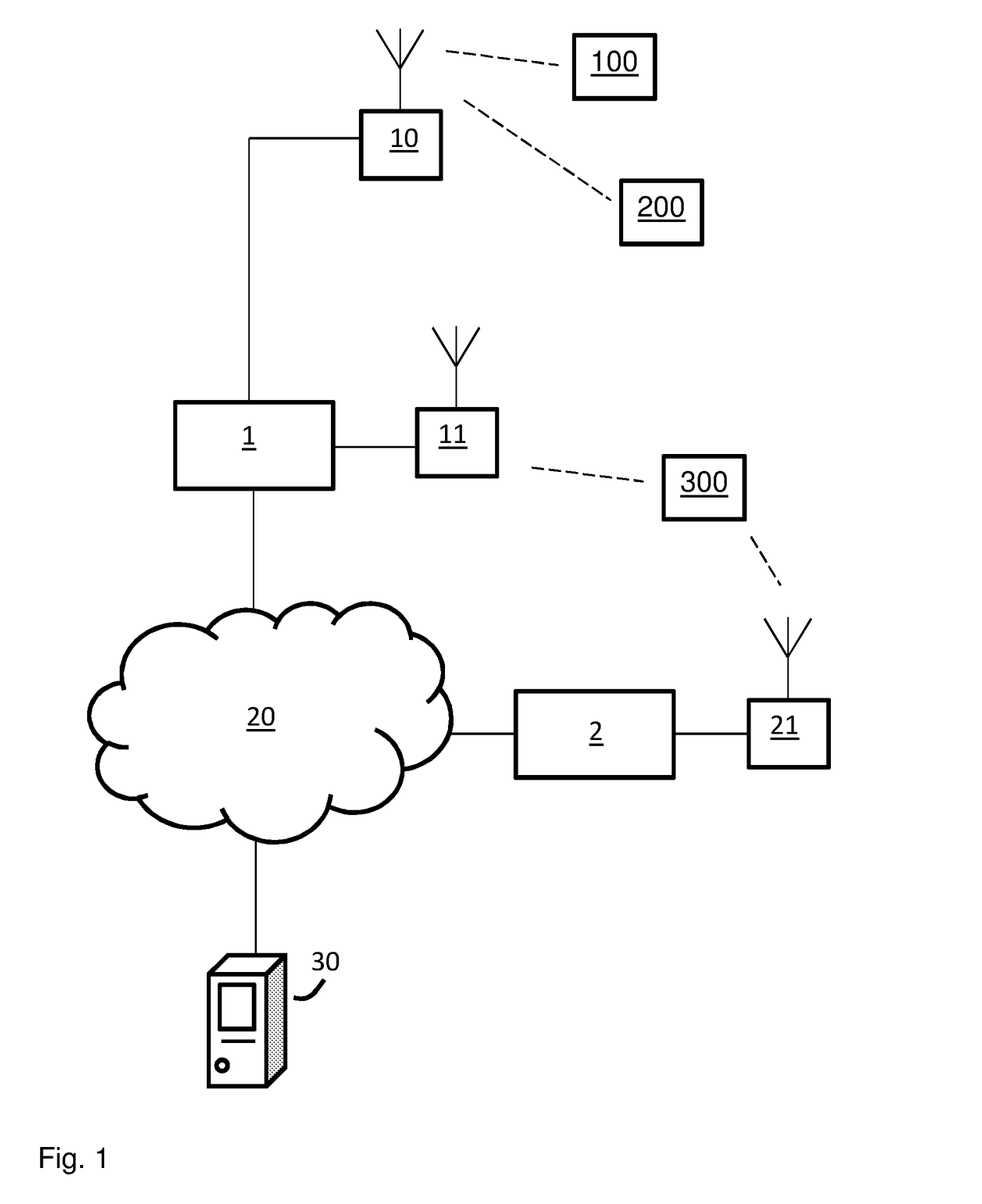
FIG. 1 schematically illustrates a system for tracking of an electronic device using a communication network.

FIG. 1 illustrates, on a schematic level, a system for tracking or monitoring of a position or related data of electronic devices 100, 200, 300. The electronic devices 100, 200, 300 are preferably mobile, in the sense that they may move between various positions or locations. Each electronic device 100, 200, 300 is configured to communicate with other entities over one or more wireless communication networks. Such networks may include a core network 1, 2, which in turn may be connected to other networks 20 including the Internet. For the purpose of providing wireless communication, each network may include access nodes 10, 11, 21, connected to the core network 1, 2. In one embodiment, an access node may be a the base station 10, 11 configured to provide radio access within a dedicated area, within which electronic devices 100, 200 configured to operate in the wireless network system may be connected to the access nodes 10, 11. The radio communications system may be cellular, and is mainly referred to herein in the example of LTE or New Radio, and such access nodes may be an eNB or gNB. Alternative embodiments may be or include non-cellular networks, though, such as WLAN, where the access node 21 may be an access point. Other wireless technologies may also apply, and the specific technique or specification for defining an air interface as well as control and data signaling may vary. In various embodiments, an electronic device 100, 200, 300 may be configured to communicate with different types of wireless networks, including both cellular and non-cellular access nodes.

A network entity 30 may be communicatively connected to the electronic devices 100, 200, 300 over one or more of the wireless networks. The network entity 30 may include a network server and may include processing power by cloud implementation. The network entity may be configured to carry out remote control or monitoring of one or more electronic devices 100, 200, 300, inter alia for tracking. The network entity may thus be configured to receive data uploaded from, and possibly transmit data in downlink to, the electronic devices 100, 200, 300.

Figure 2:
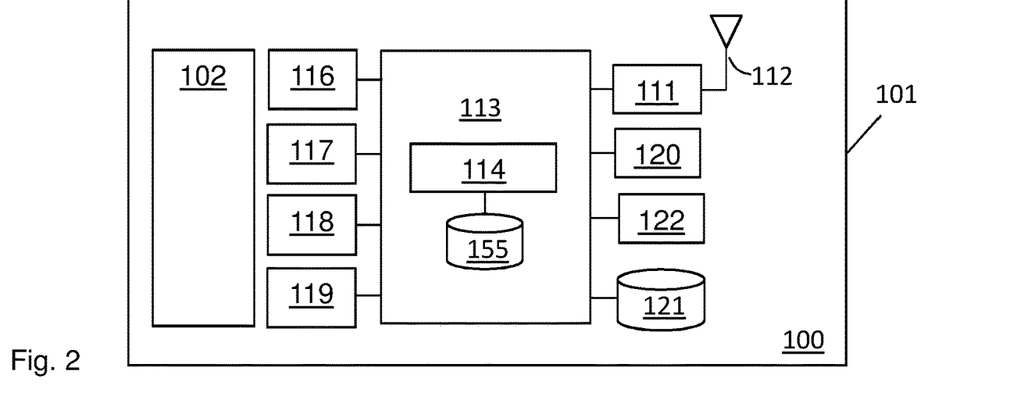
FIG. 2 illustrates a block diagram of the electronic device.

FIG. 2 discloses a block diagram of certain elements forming part of an electronic device 100. The electronic device 100 may take several different forms and incorporate different functions. In accordance with some of the embodiments presented herein, the electronic device 100 may comprise a control unit 113 including one or more processors 114, which may be a central processing unit (CPU), microcontroller, microprocessor, ASIC, FPGA, or any other specific or general processing device. A data storage device 155 is configured to include a computer readable storage medium. The data storage device 155 may include a memory and may be, for example, one or more of a buffer, a flash memory, a hard drive, a removable media, a volatile memory, a non-volatile memory, a random access memory (RAM), or other suitable device. In a typical arrangement, the data storage device 155 includes a non-volatile memory for long term data storage and a volatile memory that functions as system memory for the control unit 113. The data storage device 155 may exchange data with the processors 114 over a data bus. Accompanying control lines and an address bus between the data storage device 155 and the processors 114 also may be present. The data storage device 155 is considered a non-transitory computer readable medium. The processors 114 may execute instructions stored in the data storage device 155 or a separate memory in order to carry out operation of the electronic device 100. Additional software programs or code may reside in other entities, accessible as cloud-based through a wireless network. The instructions, when executed by the processors 114, may cause the electronic device 100 to perform any of the methods described herein.

The electronic device 100 further comprises at least one radio unit 111, which in turn is connected to an antenna 112. The radio unit 111 may include a modem and a radio transceiver, forming circuitry that enables the electronic device 100 to establish the connection with a wireless network, such as a cellular network. The radio unit 111 may include one or more radio frequency transceivers and an antenna assembly.

A power supply 102 may supply power to the elements or units included in the electronic device 100. Preferably, the power supply is provided in the shape of a non-removable battery or fuel cell 102. The electronic device 100 may also include a SIM card slot in which a SIM card is received, or a built-in card, such as an eUICC (not shown). Such a slot or built-in card may include any appropriate connectors and interface hardware to establish an operative connection between the electronic device 100 and the card. Such a SIM card or eUICC may store items of information, such as one or more of a unique serial number (e.g., an integrated circuit card identifier or ICCID), an international mobile subscriber identity (IMSI), security authentication and ciphering information, temporary information related to a local network, a list of the services the user has access to, password data, etc.

The electronic device 100 may comprise or be connected to a number of other features and functions, such as sensors or sensor interfaces 116-120, additional data memory storage 121, and a real-time clock (RTC) 122. As such, the electronic device 100 may include a positioning unit 120, including a position data receiver, such as a global positioning system (GPS) receiver, configured to assist in determining the location of the electronic device 100 in a geographical coordinate system with a fixed relation to Earth, e.g. given by a combination of latitude, longitude and elevation as known in the art, or given by x, y (and optionally z) coordinates. Alternative solutions for a positioning unit 120 may include a radio triangulation device using cellular base station signals, such as OTDOA (Observed Time Difference Of Arrival). In still further embodiments, positioning may be accomplished at least partly by means of connected or built-in sensors such as an accelerometer 116 and a magnetometer 117. The electronic device 100 may further be configured to detect other sensor parameters, such as by means of a temperature sensor 118 or a gyroscope 119.

The electronic device may be an M2M device and thereby configured to communicate with a wireless radio network by radio, e.g. as an NB-IoT device, by means of the radio unit 111. The various elements may be contained or carried in a housing 101, which may be waterproof to a certain predetermined level, such as e.g. IP67 according to the IEC standard 60529.

The electronic device 100 is preferably configured to communicate at low data rate and/or with long cycles of inactivity between transmissions. The actual characteristics of radio communication are not the within the scope of this disclosure and are thus not discussed in any further detail. However, the character of electronic device 100 is preferably that of low complexity and cost, and small size, such that it may be suitably incorporated in various structures and provided in large volumes.

Figure 3:
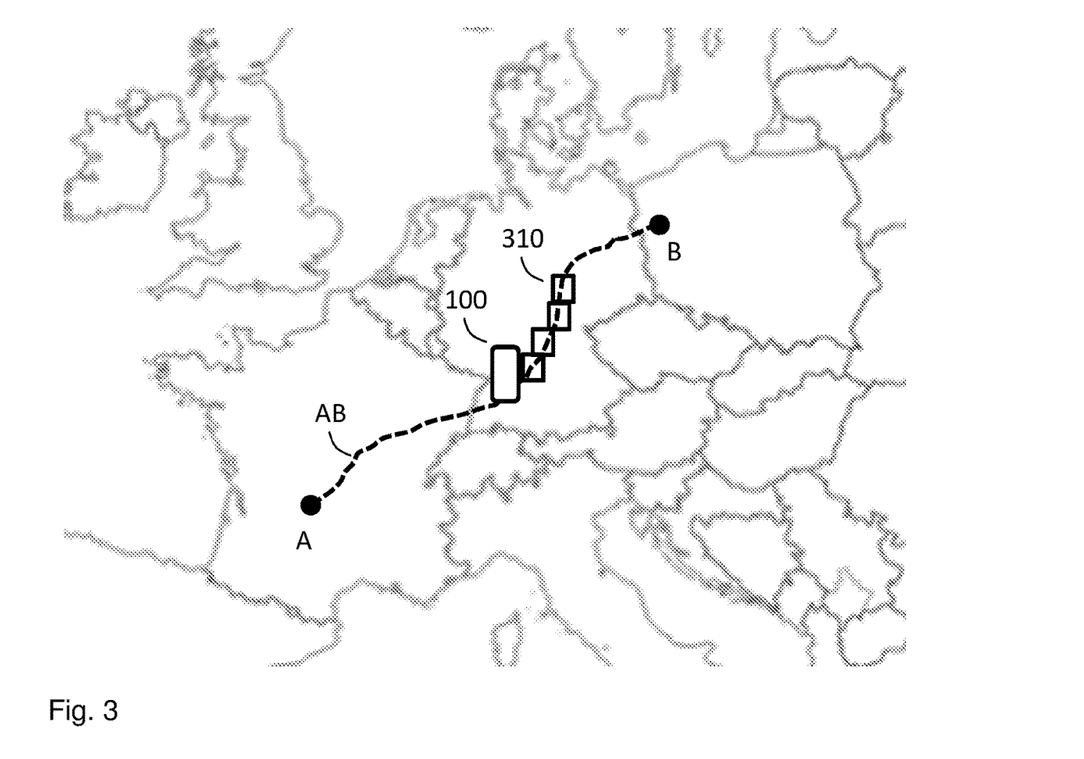
FIG. 3 schematically illustrates an electronic device in transit between locations A and B.

FIG. 3 illustrates an embodiment in which the electronic device 100 is used for tracking. More specifically, the electronic device 100 may be used for tracking goods within the logistics industry. In such embodiments, the electronic device may be packed together with the goods in question, such as in or attached to a package for the goods. In alternative embodiments, the electronic device may be attached to or incorporated in a goods carrier, such as a pallet or basket, for carrying various types of goods. FIG. 3 illustrates an exemplary situation in which the electronic device 100 is a tracker device in transit from a location A to a location B along a route or path AB which extends through a number of countries. However, in other embodiments, the methods disclosed herein are equally applicable to a route AB within one single country.

In a typical logistics example, a sender of certain goods, such as a seller or provider, orders transport of its goods from a transport supplier, to take the goods from a point A to a point B, where an intended recipient may receive the goods. The transport supplier may deliver the goods using its own service and transport vehicles or may predominantly act as a service controller and in turn purchase the actual delivery from a haulage contractor. A waybill showing the intended point B that follows the goods, e.g. attached to a package carrying the goods, may be the only item identifying the goods and its intended destination as it is delivered from one contractor to the other. One of the most important parameters in the delivery of goods is the estimated time of arrival (ETA). Point B may only be adapted to store received goods for a short time before pickup by a recipient, and a more precise determination of ETA may therefore not only provide an attractive service to an end customer, but also save storage space.

In one embodiment, an electronic device 100 is employed in a logistics service for transportation of goods. The electronic device 100 may be devised as a substantially flat and compact unit, which may be packed together with the goods, either in or attached to a package or carrier of the goods. The electronic device will then accompany the goods even if it is subjected to change of transportation means or suppliers.

The electronic device 100 preferably has an ID which identifies it uniquely or as part of a group of electronic devices, at least to the system employed for tracking the electronic device. The ID may e.g. be an IMEI number or a proprietary type ID, stored e.g. in memory 155. Alternatively, or additionally, an ID may be temporarily given to the electronic device 100 for the purpose of a certain transport tracking task, as selected by the party ordering the transport.

Furthermore, the electronic device is configured with memory storage 121 for storing data related to a route of the transport. This data may be stored into the memory storage 121 by the transport supplier, or directly by the purchaser of the delivery service, e.g. through a web interface. Download of such data into memory storage 121 may be carried out by attaching the electronic device 100 to a computer by means of a connector (not shown), or by wireless download using e.g. radio, such as a short range BLE or NFC connection, or an optical or inductive connection.

In some embodiments, data related to a route of the transport may include a route plan AB, comprising several waypoints placed along the intended path for the goods transport. Data related to the route may also include location area data for a portion 310 of the route, such as future portion of the planned route AB, as shown in the drawing. In various embodiments, the method may comprise storing, e.g. in the memory storage 121, location area data in the form of one or more geofences 310. The location area data, such as geofence(s), may be pre-stored in the memory storage 121. Alternatively, geofences may be retrieved by the electronic device 100 by download, e.g. from a dedicated server. In one embodiment, one or more geofences may be stored at a time in the memory storage 121, covering a next intended path of the route AB. Data related to passed location areas may be automatically deleted from the memory storage 121. Furthermore, further future geofences may be downloaded as the electronic device closes in on the associated location area. Each geofence may be defined in geographical coordinates to correspond to one or more countries or a region within a country, or a region overlapping more than one country. In one embodiment, the geofence is a map. In another embodiment, which is more memory efficient, the geofence is a polygon. Such a geofence may be defined by its vertices, the number of which may be selected to achieve sufficient conformity to the relevant geographical area (country/region). In yet another embodiment, which is even more memory efficient, the geofence is an ellipse or a circle.

As the electronic device 100 travels along the path AB, it is valuable to occasionally determine its current position. This information is primarily important for determining or fine tuning the ETA, but also for determining possible need for re-routing. However, the electronic device is preferably made as compact as possible and shall preferably not require re-charging, at least between A and B. Energy conservation is thus a key factor. While position update may be required with a certain periodicity, or with certain spatial intervals, each uplink connection by the electronic device 100 to report its position, e.g. to the network entity 30, will consume a considerable amount of energy from the power supply 102, by starting up the radio unit 111, and attempting to set up a connection to the network. A solution is therefore proposed herein, targeting the overall objective of energy conservation in the context of tracking an electronic device 100.

In one aspect, a method is proposed which involves tracking using an electronic device 100. This method may e.g. be used for tracking goods during transport along a route AB, wherein the method is performed in the electronic device 100 accompanying said goods. The electronic device 100 is configured to intermittently upload data to a wireless network, such as a cellular network. Data to upload may include obtained position data for the electronic device, such as for a current or recently determined position. Other or alternative data to upload may include obtained sensor data, such as temperature or shock.

Figure 7:
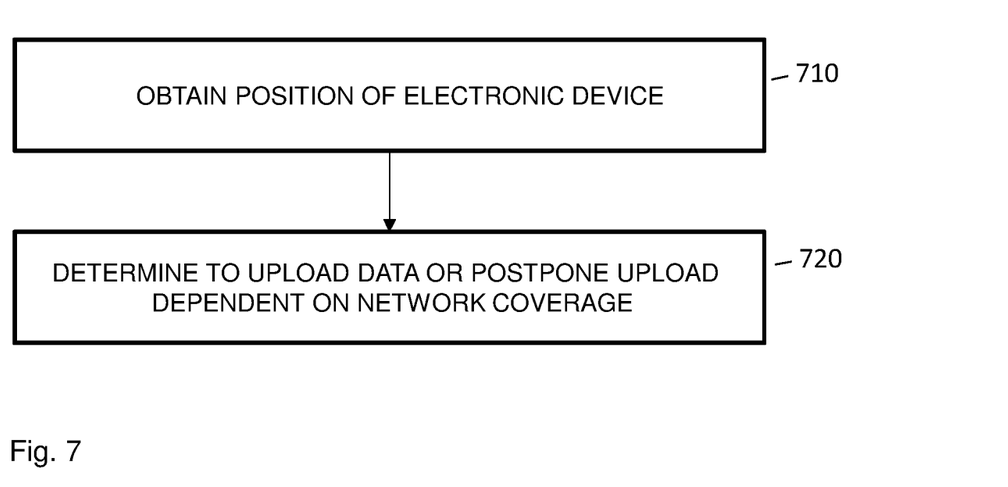
FIG. 7 schematically illustrates a flow chart of method performed by the electronic device in accordance with various embodiments.

As indicated in FIG. 7, the method may comprise:
obtaining 710 a current position of the electronic device, and determining 720, dependent on network coverage associated with said position, to either upload data to the network, or postpone upload of data.

A typical basic upload scenario for the electronic device 100 may be to upload data on a scheduled basis, e.g. once every hour. This proposed solution is to control the upload timings by using the network coverage for geographical location areas together with the route AB the tracker will take. Specifically, upload of data is carried out not only dependent on time and or position, but also on network coverage.

In the context of this disclosure, network coverage may be reflected by an amount of power or energy required to establish connection and/or to send uplink data. This may be associated with associated network coverage data, reflecting connectivity or data transmission requirements. Network coverage data may in one example be, or be associated with, a determined or measured received signal strength indicator (RSSI) value related to a certain position or location area, i.e. a measurement of the power present in a received radio signal from the wireless network. In one embodiment, network coverage data may include a parametrization of such RSSI, where a first value may indicate good coverage and a second value may indicate bad coverage. In a variant of this embodiment, further levels may be provided.

One purely exemplary embodiment, usable for understanding how such a definition of parameters defining network coverage may be defined, is to apply a first network coverage level for RSSI better than a certain level, e.g. −80 dBm, at which data upload may be carried out by the electronic device 100. For an intermediate network coverage level, e.g. −80 to −100 dBm, connection and data upload may be carried or postponed out by the electronic device 100 dependent on other parameters, such as time elapsed since last upload or time estimated to a next position where a level 1 connectivity is available. For a third network coverage level, such as −120 dBm or worse, uplink connection shall not be established by the electronic device 100.

In another exemplary embodiment, location area data is only downloaded for areas 310 in which network coverage is determined to be sufficiently good, such as above the first or the second level as outlined above. Determination, by the electronic device 100 based on its obtained position, that it is within such a location area may then serve as a trigger to determine to upload data rather than postpone.

In one embodiment, network coverage data related to coverage or connectivity may be provided by either a wireless network operator, or from other sources, or by data collected from one or more electronic devices 100 from previous tracking in the location area. Such network coverage data, associated with location area data for an intended route AB, may be stored in the data memory 121 in the electronic device. Network coverage data may be downloaded in full, for the entire route AB, in advance when the route plan is stored. Alternatively, portions of network coverage data may be downloaded successively as the electronic device 100 moves along the route AB and uploads data, and downloads location area data.

In various embodiments, the geographical size of a location area 310, such as a geofence, may be determined based on how frequently and how much the network coverage changes along the path. For various routes AB, the size of the location areas 310 may thus be predetermined based on knowledge of the coverage along the intended route AB for the electronic device 100. However, each location area 310 may still have a certain maximum size, as determined by the amount of data is included in the location area data, in order for the electronic device 100 to include relatively limited memory space in its data memory 121.

In some embodiments, network coverage data may be entirely or partly obtained by the electronic device 100 itself, through its radio unit 111, at an associated location area, e.g. by measuring radio signal strength from adjacent network nodes 10, 11, 21.

When the upload should occur could be calculated in at least two variants. One is device centric and one is cloud centric.

On a general level, a device centric variant may be configured such that location area data, e.g. geo-fence areas 310 for the connectivity coverage along the intended route, has been downloaded into the electronic device 100 in conjunction with an earlier upload event, when the electronic device 100 had connection to its network entity 30 through the wireless network. When a new upload should be done, according to a schedule based on e.g. time, the electronic device 100 may be configured to compare its current obtained position with the geo-fence map. If the electronic device 100 determines that it is outside a location area, or inside one but with very limited coverage, it will calculate the distance to the next beneficial location, from a connectivity perspective, and make an estimation of when it will arrive to that locations, e.g. based on its average speed. This obtained data then serves as basis for the decision whether to postpone attempting to establish connection with the network and upload data. The criteria for this decision to postpone may take both the level of connectivity (none, limited, etc.) and the time to reach full coverage into consideration. In other words, if the connectivity, i.e. network coverage, is deemed to be poor but not non-existent, and the determined time to arrival to the next beneficial location is above a certain time threshold, the electronic device 100 may be configured to nevertheless attempt to upload data rather than postpone.

On a general level, a cloud centric variant may be configured such that a network entity 30, which may be distributed as a cloud service, makes a determination based on which the electronic device may decide or schedule data upload. From a last upload by the electronic device 100 the network entity 30 will determine the current position of the electronic device 100, based on position data contained in the upload data. The network entity 30 may then be configured to provide two pieces of information in its response to the electronic device 100, so that the electronic device 100 may decide when to make the next upload attempt. First the network entity 30 will select a suitable position or location area for the next attempt based on a connectivity/network coverage map stored in the network entity 30 or otherwise accessible in the cloud. This position or location area could e.g. be a geo-fence polygon or a fixed position with a radius and serves as a "next upload position". The second piece of information is a partial ETA, i.e. estimated time of arrival to the "next upload position". This information may be used in the electronic device to set an internal timer to boot up. Booting and connection attempts are very costly energywise, so it provides a technical benefit to do these as seldom as possible. This second piece is particularly beneficial if the positioning unit 120 of the electronic device 100 has long GNSS acquisition interval times.

As exemplified, the network entity 30 will select a suitable position or location area for the next attempt based on a connectivity/network coverage map. Based on this information, and the knowledge of the intended route, the network entity 30 may determine a suitable point in time when the electronic device 100 is expected to be within that location area. The network entity 30 may thus transmit information identifying that point in time to the electronic device 100. The identification of that point in time may be provided as a time period, rather than or in addition to a fixed time instance, within which the electronic device 100 is calculated to be within that location area. The point in time may be identified by reference to an RTC value, or as a delta value counted from a preceding point in time, such as from transmission of the information, or from a last update. A specified rule may be predetermined, such that the information conveyed by the network entity 30 is adequately interpreted in the electronic device 100 to determine the time information for the next data upload. In various embodiments, the time information may be accompanied with the location area data.

The proposed solution may be applied to various scales of location areas, such as location areas in the order of a few kilometers or, or in a larger scale with location areas in the order of tens or hundreds of kilometers.

Figure 4:
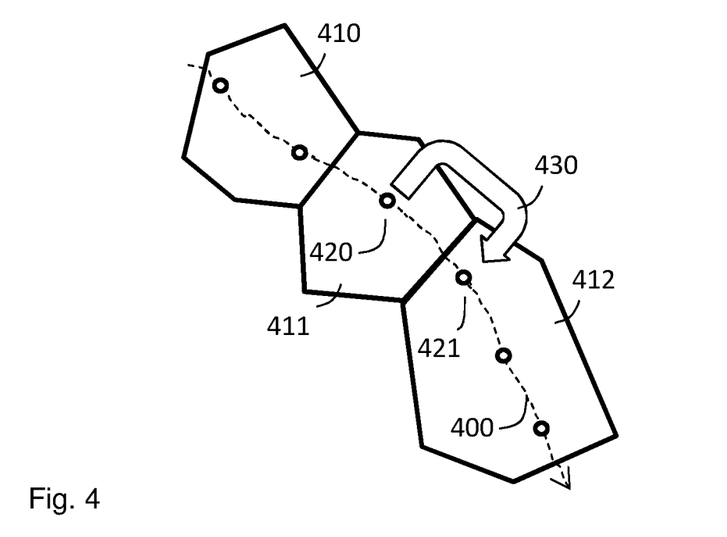
FIG. 4 illustrates postponement of data upload from an electronic device.

FIG. 4 schematically illustrates a route 400, and various location areas 410, 411, 412 along said route. The route 400 may e.g. comprise a series of roads. An electronic device 100 (not shown in this drawing) configured for tracking, as described herein, is intended to follow the route 400, e.g. accompanying goods for transport on a vehicle. A network entity 30 (not shown), such as a server or a cloud service, is configured to receive data uploaded from the electronic device for tracking purposes, including at least position data for the electronic device 100. Upload of data from the electronic device is preferably intermittent, e.g. with a predetermined default periodicity, or based on speed. The period between uploads may e.g. be in the order of one hour or a number of hours. At more frequent instances, marked by rings along the route 420 in the drawing, the electronic device 100 is configured to determine its position, e.g. by means of a GPS positioning unit 120.

In the illustrated example, the electronic device 100 is configured to upload data at the instance 420. This is marked as coinciding with an instance for obtaining position, but data upload may be separate from positioning in time. However, at that position 420, network coverage or connectivity is unsatisfactory. As exemplified, this may be determined based on coverage data associated with the location area 411, or e.g. from measurements carried out by the electronic device 100. Based on location area data, stored in data memory 121, the electronic device is configured to determine that a subsequent location area 412 provides satisfactory network coverage, based on stored associated network connection data. As indicated by the arrow 430, the electronic device 100 may then be configured to postpone connection attempt for data upload.

In one embodiment, the attempt to upload data may be postponed to an instance 421 of positioning in the subsequent location area 412 and include position data for the position obtained at that subsequent instance 421 in the uploaded data. In an alternative embodiment, the electronic device 100 may be configured to estimate a time to enter the subsequent location area 412, and upload data including the latest obtained position at instance 420. In yet another embodiment, an unscheduled positioning may be carried out as soon as the location area 412 with satisfactory network coverage is entered, and upload data including that last positioning data.

In one embodiment, the electronic device may be configured to estimate a projected time to a next location area 412, or specifically to a scheduled instance of positioning 421 in that subsequent location area 412, for which stored associated network connection data indicates satisfactory network connection. Based on the projected time to reach that location area 412, a determination whether to postpone 430 an attempt to upload data may be taken based on a predetermined maximum time between data uploads, as counted from a last data upload. If the time from the last data upload to the next instance 421 of satisfactory network connectivity exceeds such a maximum time, the electronic device may be configured to attempt connection at the current instance 420 instead of postponing. With regard to the embodiment mentioned above, this decision to attempt upload of data may be taken only if the network coverage, or connectivity level, at the current position exceeds a certain level, such as the mentioned intermediate level.

In an alternative embodiment, the electronic device 100 may have location area data stored in data memory for location area 410 and 412. In the intermediate area 411, network connection is below a level that indicates that no upload attempt should be made. Therefore, no location area data, such as a geo-fence, is stored at all for that area. Hence, the electronic device at a current position 420 may, after obtaining its position and comparing to stored location area data, determine that no matching location area or no network coverage data is stored, associated with the current position. Based thereon, a decision to postpone attempted data upload may be made. Again, such a decision to postpone may also take other parameters into consideration, such as estimated time to a next location area 412.

Figure 5:
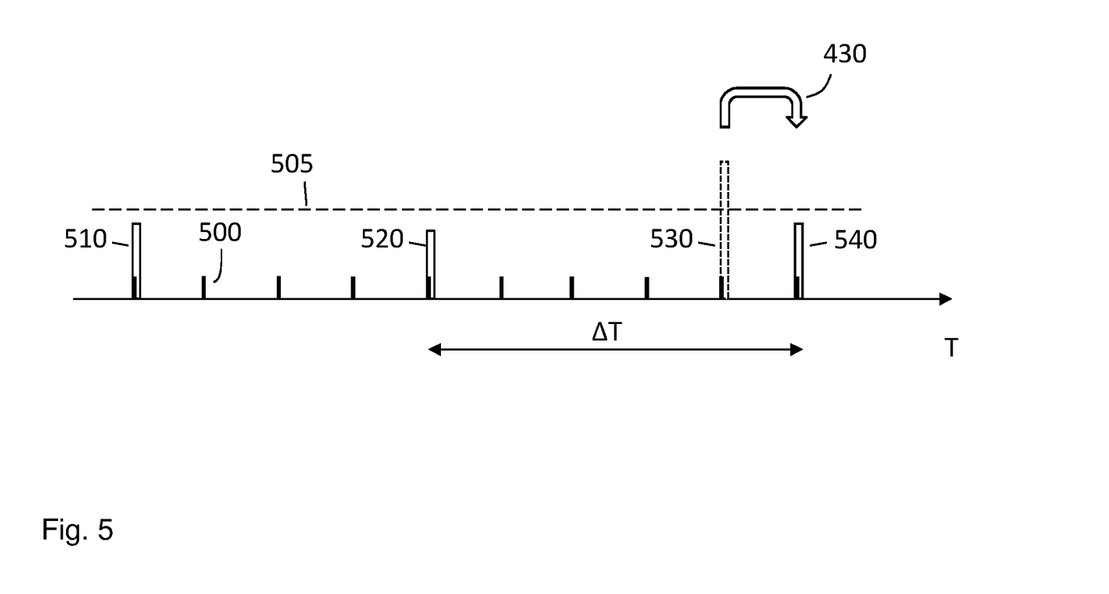
FIG. 5 schematically illustrates a time diagram of data upload from an electronic device based on network coverage.

FIG. 5 schematically illustrates a timeline showing actions taken by the electronic device 100 under tracking, correlating with the drawing of FIG. 4. A number of positioning instances 500 are illustrated, and in this example the positioning is carried out on a regular basis with a certain periodicity. In alternative embodiments, positioning instances 500 may be more or less irregular. At certain occasions 510, 520, 530 the electronic device is scheduled to upload data, including at least obtained position data. Such an instance may include waking up a radio unit 111, attempting to establish connection with a wireless network, and transmitting data to an access node 10 of the network. In one embodiment, such data upload attempt is carried out dependent on network coverage associated with the position. In the example of FIG. 5 this dependency includes the determination of uploading data to a network entity if the network coverage or connectivity level is such that the required signal strength for uploading does not exceed a certain level 505. As earlier noted, this may be correlated with an RSSI level or similar for a wireless network. At an intended instance 530 of data upload, the network coverage or connectivity is such that the required energy or power for succeeding with an upload attempt is deemed to exceed the level 505. Based thereon, the electronic device 100 is configured to postpone the data upload attempt to a later instance 540, where again the network coverage or connectivity is adequate. In the illustrated example, postponement is made to a next instance of positioning 510, but the postponement may be longer or shorter.

In one embodiment, the electronic device 100 may be configured to postpone attempted data upload to a later instance 540 based on a determined time $\Delta T$ counted from a last data upload. The electronic device 100 may thus be configured to postpone if the network coverage at the scheduled instance 530 requires more than a predetermined level 505 of energy or power, and if $\Delta T$ does not exceed a predetermined time limit. If not both these criteria are met, an attempt, to upload data may be nevertheless be carried out at the scheduled instance 530.

Figure 6:
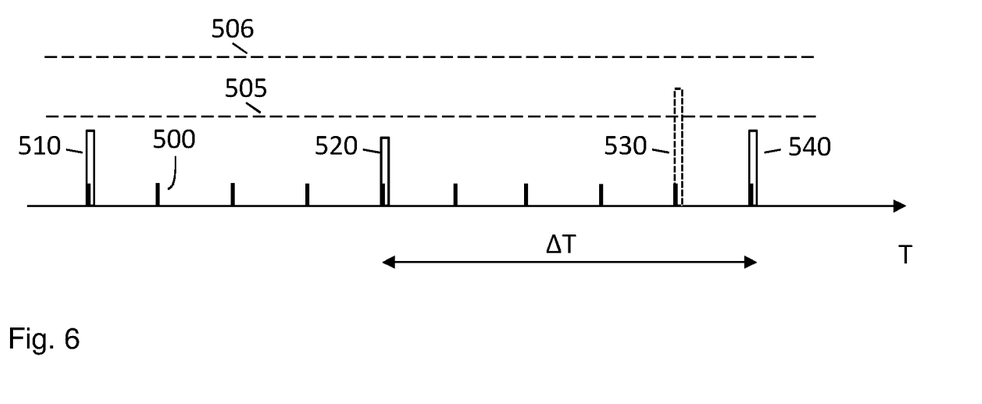
FIG. 6 schematically illustrates a time diagram of data upload from an electronic device based on different levels of network coverage.

FIG. 6 illustrates a variant of FIG. 5, wherein the determination of whether or not to postpone may be made dependent on more than one level of connectivity, as previously outlined. The electronic device 100 may thus be configured to postpone if the network coverage at the scheduled instance 530 requires more than a predetermined level 505 of energy or power, and if ΔT does not exceed a predetermined time limit. If not both these criteria are met, an attempt, to upload data may be nevertheless be carried out at the scheduled instance 530. However, if the network coverage or connectivity is even worse, such that an energy or power exceeding a second, higher, level 506, the electronic device may be configured to postpone attempted data upload to a later instance 540 even if the predetermined time limit ΔT is exceeded.

Returning to FIG. 2, the electronic device 100 is never configured in paging mode when it is configured for tracking. The radio unit 111 is thus never turned on, except in the short period that the electronic device sends data, such as in instances 510, 520 of FIG. 5. All other time both a modem of the radio unit 111 and the control unit 113, such as an application MCU, are turned off with the exception of a RTC 122. The RTC is configured to wake up the system when it is time to e.g. read sensors 116-1120 or to send data with radio unit 111.

A typical tracking use case may involve the following:
1. The electronic device 100 is turned off except RTC. Typical 5-10 uA current consumption.
2. Every 15 min the MCU 113 wakes up and read sensor values. Then back to 1. Typical 7-8 mA current consumption in 10 s.
3. Every hour the MCU 113 wakes up. The MCU 113 then wake up the modem of the radio unit 111 and subsequently sends upload data, including position data and potential other sensor data. Then back to 1. Typical 150-300 mA current consumption in 30 s, with a potential current peak >1 A for GPRS and >600 mA for LTE, mainly for TX power.

A problem related to attempted data upload is that if the temperature is low (in step 3), the modem activity in the radio unit 111 will result in a battery voltage drop and the entire system will may reset or turn off. Specifically, the battery voltage will drop significantly during peaks, due to internal resistance in the battery 102. If the battery 102 is almost empty, the voltage will drop below the "shut-down" voltage and the electronic device 100 will turn off. If the battery 102 is cold, such as during transport of goods comprising the electronic device 100 on a vehicle during winter, the internal resistance will raise even more and the electronic device 100 may turn off due to low voltage even if there is significant capacity left in the battery 102. This results in an overall shorter battery time and tracker lifetime.

To overcome this problem, i.e. to avoid the electronic device 100 to turn off due to low battery voltage, it is beneficial to find out when the environment is as warm as possible and run the radio communication at that time. In one embodiment, this may be carried out using a connected or built-in temperature sensor 118.

In one embodiment, the electronic device 100 is configured to measure how the behavior and voltage curve for the battery 102 depends at temperature. Based on the determined behavior, the electronic device 100 is capable of calculate the expected voltage drop at a given time and temperature. If the expected voltage drop is so high that the device would or could turn off, the electronic device 100 may be configured to avoid using the radio unit 111 at that moment. The electronic device 100 may thus be configured to determine parameter data associated with estimated temperature, e.g. using a built-in temperature sensor 118. In such an embodiment, the parameter data may be associated with estimated, e.g. measured, current temperature. The electronic device 100 may further determine to postpone upload of data based on said network coverage and on said parameter data. With reference to FIGS. 4-6, the decision to postpone attempted data upload may thus be taken based on only network coverage, only time elapsed since last upload, only temperature, or a combination of any of these parameters.

In an alternative embodiment, parameter data reflecting temperature may be determined based on other or additional input than a built-in temperature sensor. The objective is to determine when it is as warm as possible, for scheduling or determining to postpone data upload by activating the radio unit 111. Examples of parameter data may include at least one of
1. Time of the day. Typical warmer at lunch and afternoon.
2. Temperature trend, based on previously determined temperatures.
3. Location. For some tracking use cases you know the expected route to be used and can use downloaded information for where it normally is warmest, such as in urban areas. Alternatively, the expected route may be used to download weather forecast to see when in time, in what area, it should be warmest.

In one embodiment, for which these three are examples, a decision whether to attempt data upload or postpone to a subsequent position or point in time, may thus include determining parameter data associated with estimated temperature, wherein determining to postpone upload of data is carried out based on said network coverage and on said parameter data. More specifically, the parameter data need not, or not only, be associated with temperature at a current position, but may be associated with an estimated temperature at said subsequent position or point in time, based on e.g. time of day, temperature trend or location.

As noted throughout this disclosure, it is of critical importance for an electronic device 100 used for tracking, e.g. for tracking goods, to be as power-efficient as possible such that the device's lifetime is maximized while batteries are kept small. In various embodiments, the electronic device 100 has the ability to use sensors such as GPS 120, accelerometer, gyroscope, magnetometer (compass) and thermometer. Additionally, it can access information about radio performance conditions from the cellular radio components, and it is equipped with a real-time clock for keeping track of time. Power consumption of the vital system components can be indicated in declining order as follows:
1. Cellular radio uploads (most power hungry), radio unit 111
2. GPS 120
3. Gyro 119
4. Accelerometer 116
5. Magnetometer 117
6. Real-time clock (least power hungry) 122.

Specifically, with regard to the radio transmission, it should be noted here that the wake-up activity of the cellular modem of the radio unit 111 itself is a major power-consuming activity, hence should be done infrequently. The actual transmission time (and the associated power spent) is heavily dependent on the specific radio condition at that moment, hence transmissions should preferably be done at route positions where radio conditions are optimal.

Additionally, a GPS sensor of the positioning unit 120 consumes substantial power during wake-up and for obtaining a fix, i.e. taking a positional sample. Hence, it is beneficial to use the GPS as infrequently as possible for estimating the tracker's 100 position.

The electronic device 100 also has the ability to store a priori information concerning the current intended route and a radio coverage map of the surrounding area, e.g. in a data memory 121, as described. The coverage map of the local area or current route is compact and easily fits in device memory. If the map would need to be partially downloaded, this represents a small payload (short time) compared to wake-up and signaling overhead of the cellular radio communications.

The current state of the art to optimize device power consumption includes basic schemes to control the frequency of taking GPS samples, and the frequency and size of data communicated over cellular networks. Such basic schemes may still lead to sub optimal usage of the most power-hungry components and activities of the system. However, if the electronic device 100 could optimally utilize the combined above information in a strategy to both minimize the use of the most power-hungry components of the system, and take advantage of a priori knowledge of radio conditions, the device's lifetime could be greatly improved. In one embodiment, a model optimized for precise tracker upload position by using only a minimal set of sensors is therefore suggested.

Given a tracking system, as defined by a network entity 30 and executed using an electronic device 100 as a tracker, and the expected route AB, the route is applied onto the radio coverage map to find route positions with optimal radio conditions where we should perform data upload. This may be obtained in a device centric or a cloud centric variant, as noted.

With the specific aim to minimize the usage of high power consuming sensors, such as radio and GPS, the electronic device 100 is in various embodiments instead configured to estimate distance to the next optimal upload positions using samples from low power sensors, such as accelerometer 116 and RTC 122, together with a prediction model. From the route information, using a latest GPS position and a calculation of velocity, the electronic device 100 may be configured to effectively estimate the distance to the next optimal upload position by using only the RTC 122, a magnetometer 117 and an accelerometer 116.

By using the accelerometer 116 and the RTC 122, the electronic device 100 may be configured to estimate the distance travelled along the route by sampling the tracker's acceleration/retardation. This approach can work sufficiently well if the accelerometer 116 is of a low noise and drift type.

In addition, a method is proposed for further calibrating the real-world position by utilizing the magnetometer 117 in combination with route information. The magnetometer 117 is more accurate in defining slow orientation changes compared to accelerometer 116 or gyro 119, hence the electronic device 100 may be configured to map the sensed orientation changes during transport to actual directions extracted from the detailed route description.

In one embodiment, a method involves the following:
1. Apply route onto the radio coverage map to find route positions with optimal radio conditions for upload.
2. Extract a plurality of (direction, latitude, longitude) data point from the route description.
3. Using data from step 2, train two learning functions, e.g. regression models, by mapping direction and distance travelled (from route start) to latitude and longitude.
4. Estimate distance travelled since the last known GPS position using calculated velocity, accelerometer samples, and real-time clock.
5. Sample the orientation from the magnetometer.
6. Infer latitude and longitude using learning functions from step 3 and data from steps 4 and 5.
7. If inferred position is near optimal upload position by some threshold, turn on GPS and sample actual position.
8. If actual position is near optimal upload position by some threshold, turn on radio and transmit data.

With this approach, the electronic device 100 may be configured to both estimate and continuously re-calibrate the position estimate and minimize actual drift, thus provide a much higher accuracy in the prediction of optimal upload position. This way, a novel feature is introduced by using low-power sensors and a learning function to estimate the optimal upload position. By letting the power-hungry sensors, such as GPS 120, stay inactive longer, and use the cellular network when much less power is required for data uploads, power consumption is decreased.

The invention claimed is:

1. A method for controlling upload of data, performed in an electronic device, wherein said electronic device is configured to operate as a tracker by intermittently uploading data to a wireless network while moving along a route, said method comprising, at a scheduled occasion for data upload:
    obtaining a current position of the electronic device;
    determining coverage data associated with said current position based on a stored network coverage map;
    determining, dependent on the coverage data of the network coverage map, to postpone upload of data to a later instance, based on
        the stored coverage data associated with said position not exceeding a first coverage level threshold, and
        a time limit between data uploads not being exceeded at said later instance;
    or otherwise attempt to upload data.

2. The method of claim 1, comprising
    determining to postpone upload of data based on
        the stored coverage data associated with said position not exceeding a second coverage level threshold, representing a lower coverage level than the first threshold.

3. The method of claim 1, wherein said later instance is determined as an expected time of arrival in a subsequent location area.

4. The method of claim 3, wherein the subsequent location area is a next location area along said route having an associated network coverage exceeding the first coverage level threshold.

5. The method of claim 1, wherein said later instance is a next scheduled instance of positioning.

6. The method of claim 1, wherein obtaining a current position is carried out based on predetermined positioning interval data.

7. The method of claim 1, wherein uploading of data, including position data, is carried out based on predetermined upload interval data.

8. The method of claim 7, comprising
    turning off a radio unit in the electronic device between scheduled occasions for data upload.

9. The method of claim 1, comprising
    downloading, via said network, network coverage map including location area data for a subsequent location area having an associated network coverage exceeding the first coverage level threshold.

10. The method of claim 1, comprising
- determining parameter data associated with estimated temperature;
- wherein determining to postpone upload of data is carried out based on said parameter data indicating a battery voltage drop in the electronic device exceeding a threshold.

11. The method of claim 1, wherein said route includes a number of route positions, the method comprising
- obtaining sensor data related to movement of the electronic device;
- wherein obtaining a current position includes
- determining a preceding obtained position;
- calculating a position based on said sensor data, subsequent route positions, and a real-time clock;
- determining to obtain a current position when the calculated position matches a subsequent route position.

12. The method of claim 1, wherein the electronic device is connected to accompany goods during transport along said route.

* * * * *